United States Patent [19]

Kako et al.

[11] 3,969,321

[45] July 13, 1976

[54] MANUFACTURING PROCESS FOR PRODUCING REACTION PRODUCTS OF PHENOL-FORMALDEHYDE RESINS WITH LIQUID CHAIN-GROWTH POLYMERS OF HYDROCARBON DIENES

[75] Inventors: Yuji Kako, Shizuoka; Toyoji Kikuga, Fujieda; Akira Toko, Yokohama, all of Japan

[73] Assignee: Sumitomo Durez Company, Ltd., Tokyo, Japan

[22] Filed: Oct. 1, 1974

[21] Appl. No.: 510,875

[30] Foreign Application Priority Data
Oct. 3, 1973   Japan............................ 48-110487

[52] U.S. Cl............................. 260/59 R; 260/62; 260/845; 260/846
[51] Int. Cl.².................. C08G 8/30; C08F 283/00
[58] Field of Search............... 260/59 R, 62, 47 UP, 260/852, 845; 156/335

[56] References Cited
UNITED STATES PATENTS

| | | | |
|---|---|---|---|
| 2,137,242 | 11/1938 | Ellis | 260/59 R |
| 3,069,373 | 12/1962 | Greenlee et al. | 260/28 |
| 3,085,074 | 4/1963 | Burke et al. | 260/59 |
| 3,300,426 | 1/1967 | Hunsuche | 260/845 |
| 3,383,362 | 5/1968 | Gonzenbach | 260/62 |
| 3,420,915 | 1/1969 | Braithwaite, Jr. | 260/837 R |
| 3,538,052 | 11/1970 | Higginbottom | 260/59 R |
| 3,697,310 | 10/1972 | Kurihara et al. | 156/335 |
| 3,703,494 | 11/1972 | Anderson et al. | 117/161 L |

*Primary Examiner*—Joseph L. Schofer
*Assistant Examiner*—Peter F. Kulkosky
*Attorney, Agent, or Firm*—Peter F. Casella; James F. Mudd; David A. Stein

[57] ABSTRACT

A manufacturing process for synthetic resins is characterized by reacting oligomers produced from diene compound raw materials directly with phenols or phenolic resins in the presence of acidic catalysts.

14 Claims, No Drawings

MANUFACTURING PROCESS FOR PRODUCING REACTION PRODUCTS OF PHENOL-FORMALDEHYDE RESINS WITH LIQUID CHAIN-GROWTH POLYMERS OF HYDROCARBON DIENES

The present invention relates to a manufacturing process for synthetic resins which is characterized by reacting chain-growth oligomers produced from diene compound raw materials directly with phenols or phenolic resins in the presence of acidic catalysts. Oligomers produced from diene polymer raw materials that are useful in the invention comprise diene compound molecules with olefinic unsaturation which is substantially non-conjugated larger than dimers and less than 10,000 in molecular weight, and usually called "liquid rubber" or "liquid polymers". Monomers suitable for preparing the oligomers are hydrocarbon compounds having conjugated double bonds, such as butadiene, isoprene, pentadiene, hexadiene and the like. Olefinic comonomers such as isobutylene can also be employed, provided that more than about 20 weight percent of the oligomer is comprised of a hydrocarbon compound having conjugated double bonds. Examples of commercial products are as follows:

Liquid cis-polybutadiene ("LCB"), a product of Hüls A. G. (West Germany)
Polybutadiene ("Lithene"), a product of Lithium Ltd. (U.S.A.)
1,3-Pentadiene Polymer ("LPD"), a product of Nippon Geon Company Ltd. (Japan)
Isobutylene-butadiene Polymer ("SK"), a product of Tonen Petrochemical Co., Ltd. (Japan)
1,2-Polybutadiene ("NISSO-PB"), a product of Nippon Soda Co., Ltd. (Japan)

These oligomers usually have little or no compatibility with phenolic resins which are highly polar, so that only a small amount of such oligomers can be added for improving certain phenolic resins, viz. by merely physically or mechanically dispersing oligomers into phenolic resins.

In spite of this fact, in accordance with this invention, such oligomers have now been chemically bonded to phenols or phenolic resins by using a large amount of strong acidic catalyst, and thus obtaining such products having useful properties. Although a considerable degree of reaction occurs at elevated temperature without using such catalyst, products possessing useful properties generally do not result.

The strong acidic catalysts include various organic and inorganic acids such as hydrochloric acid, sulfuric acid, paratoluene sulfonic acid, ferric chloride, stannous chloride, boron trifluoride, phosphorus tribromide, phosphorus pentoxide and so forth.

Phenols useful in the invention include phenol, cresols, xylenols, alkyl-substituted phenols, aryl-substituted phenols and the like, and phenolic resins including novolacs or resoles prepared by reacting the phenols described above with such aldehydes as formaldehyde, acetaldehyde and the like, in the presence of acidic or alkaline catalysts, and the modified resins using various modifying agents for preparing the phenolic resins.

Examples of phenols which can be used alone or in preparing phenol-aldehyde condensates for use in practicing the invention include phenol itself or substituted phenols having the following general formula:

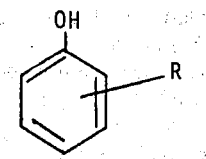

where R may be H, F, Cl, Br, or a suitable substituent selected from the following:
a. Alkyl groups of 1 to 18 carbon atoms in any of their isomeric forms and substituted on the phenolic nucleus in the ortho, meta or para positions;
b. Alicyclic groups of 5 to 18 carbon atoms such as cyclohexyl, cyclopentyl, methyl cyclohexyl, butyl-cyclohexyl, etc.;
c. Aromatic or aralkyl groups of 6 to 18 carbon atoms such as phenyl, alpha-methyl benzyl, benzyl, cumyl, etc;
d. Alkyl, alicyclic, aryl and aralkyl ketones wherein the hydrocarbon is defined hereinbefore;
e. Alkyl, alicyclic, aryl and aralkyl carboxylic groups wherein the hydrocarbon is defined hereinbefore.

Suitable substituted phenols include the following: para-tertiary-butylphenol, para-secondary-butyl-phenol, para-tertiary-amylphenol, para-secondary-amylphenol, para-tertiary-hexylphenol, para-isoctyl-phenol, para-phenylphenol, para-benzylphenol, para-cyclohexyl-phenol, para-decylphenol, para-dodecyl-phenol, para-tetra-decylphenol, para-beta-naphthyl-phenol, para-alphanaphthylphenol, para-pentadecyl-phenol, para-cetylphenol, para-cumylphenol, para-hydroxy acetophenone, para-hydroxy benzophenone, a phenol alkylated with limonene, a phenol alkylated with oleic acid, as well as the corresponding ortho and meta derivatives such as meta-butylphenol and ortho-butylphenol; as well as mixtures thereof.

From the foregoing, it is apparent that substantially any phenol can be used in practicing the present invention provided it has a reactive hydroxyl group and is capable of reacting with aldehydes such as formaldehyde to produce a condensate. The pure refined phenols may be used, but this is not always necessary. For instance, phenols may be alkylated and then reacted with an aldehyde as the crude produce which may contain some polyalkylated as well as unalkylated phenols. Mixtures of phenols mentioned herein also may be used.

In producing the phenol-aldehyde condensates, any suitable aldehyde or mixtures of aldehydes capable of reacting with a phenol and having not more than, for example, 8 carbon atoms is satisfactory provided it does not contain a functional group or structure which is detrimental to the resinification reaction. The preferred aldehyde is formaldehyde, which may be in aqueous solution or in any of its low polymeric forms such as paraform or trioxane. Other examples of aldehydes include acetaldehyde, propionaldehyde, butraldehyde, benzaldehyde, furfural, 2-ethylhexanal, ethylbutyraldehyde, heptaldehyde, glyoxal and the like.

The novolac resins are prepared by methods commonly known in the art, such as by reacting the phenols and the aldehyde in the presence of an acid catalyst such as sulfuric, hydrochloric or oxalic acid. Basic catalysts such as ammonia or amines can also be employed. Generally about 0.5 to 0.9 moles of aldehyde are used per mole of phenol. The phenolaldehyde resins can be modified with rosin or lignin by methods known in the art to provide resins that can be suitably processed in accordance with the invention.

The resoles are prepared by methods known in the art, such as by reacting the phenol and the aldehyde in the presence of an alkaline catalyst, such as sodium hydroxide, potassium hydroxide, barium hydroxide, and the like. Generally about 1 to about 3 moles of aldehyde are used per mole of phenol, preferably about 1.5 to 2.5 moles per mole.

The reaction between oligomers and phenols or phenolic novolacs mentioned above proceeds by a cationic polymerization as shown below:

1. In case the oligomer has been formed by a 1,4-addition:

mer.

The reaction between oligomers and phenolic resoles is presumed to proceed in accordance with the "methylene quinone theory" proposed by Van der Meer as a theory for vulcanization of rubber with resoles [Rev. gen. Caoutch., 20, 230 (1943)], or "Chroman theory" proposed by Hultzsch [Chemie der Phenolharze, P. 78 (1950)]. Phenols or phenolic resins modified with oligomers produced by this reaction are cured by heating with such chemicals as sulfur, and the like, which are usually used as a vulcanizing agent of rubber and/or hexamethylene-tetramine and the like, which are used generally as a curing agent of phenolic resins.

Phenols modified with oligomers have excellent com-

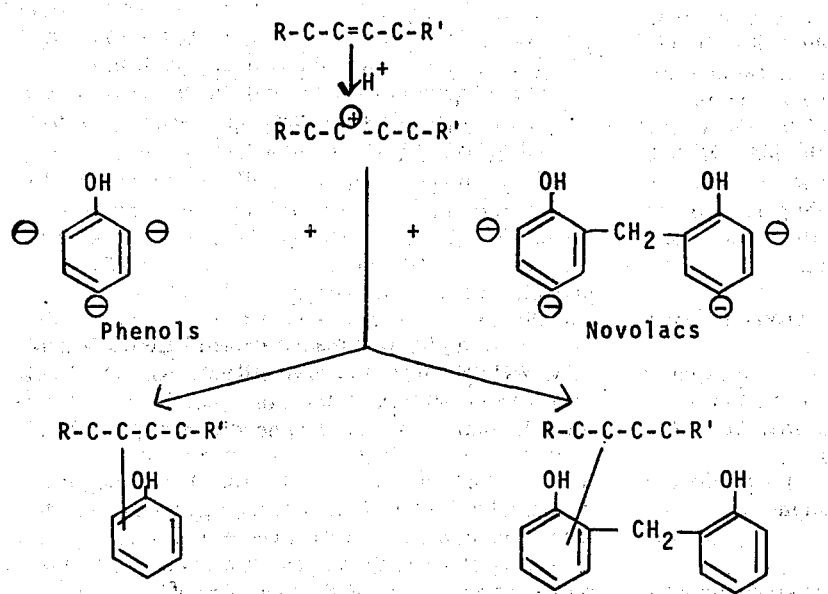

2. In case the oligomer has been formed by a 1,2-addition;

patibility with rubber, and the improvement in bonding strength in the case of blending them with natural rub-

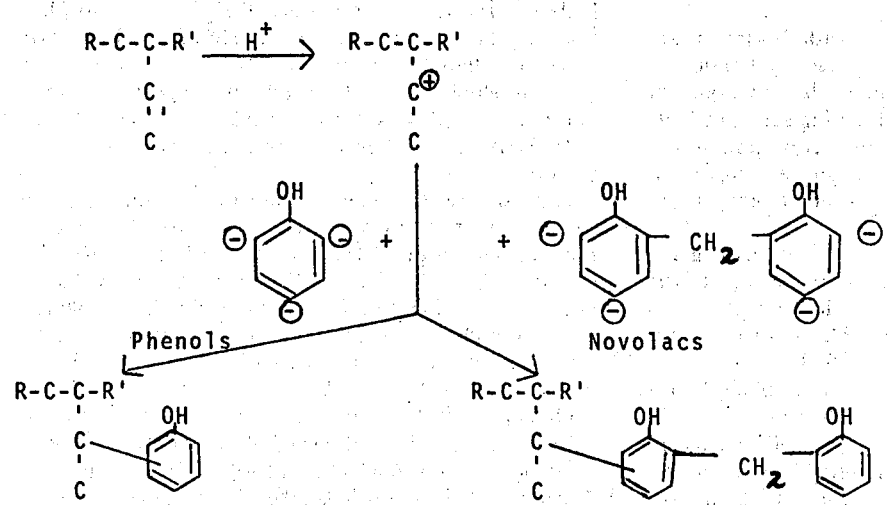

Various proportions of oligomer and phenol or phenolic resin can be employed. Generally the proportions are in the range of about 90 to 1000 parts by weight of phenol per 100 parts of oligomer, and about 50 to 1000 parts by weight of phenolic resin per 100 parts of oligober adhesives is remarkable. They have excellent compatibility with phenolic resins, and show remarkable effects as internal plasticizers of resoles. Moreover, phenols modified with oligomers which have comparatively lower degrees of polymerization exhibit excellent emulsification power when used as surfactants. On the other hand, if phenolic resins modified with oligomers are blended into rubbers, these rubbers are suitable for producing tires, belts, and so forth acting as a reinforcing agent for increasing their hardness, tensile strengths, heat resistance etc.; and if those modified oligomers are blended with phenolic resins, it is effective for modifying the toughness, flexibility, mar resistance, impact strength etc. of the phenolic resins, thus making them suitable for producing break shoes, flexible grinding wheels.

Further, oligomer-modified phenolic resins which heatcure by themselves, can be used as casting resins or can be used as fiberglass reinforced plastics, yielding products having excellent acid- and alkali-resistant properties.

The following examples are provided to illustrate in detail the manufacturing process for producing modified resins based on the present invention, but the present invention is not restricted by them. "Part" and "%" described in this specification and claims refer to parts and percentages by weight, respectively, unless otherwise specified.

EXAMPLE 1

100 parts of colorless liquid butadiene oligomer having a structure comprised mostly of 1,4-linkages and having a viscosity of 7.0 poises (at 25°C) and sold under the tradename Polyöl Hüls 100 was kept at 45°C and 120 parts of colorless liquid phenol (45°C) was added, then sufficiently mixed to make it uniform. This admixture was in an emulsified state and opaque. Next, 8 parts of sulfuric acid-phenol complex was added to it as a catalyst and reacted four hours at 170°C. Then unreacted phenol was eliminated by steam distillation and then the residual water was removed under vacuum. As a result, 190 parts of a reddish clear solid resin with a softening point of 80°C was obtained.

Comparison of the infrared spectroscopic analysis charts of the original oligomer with the product resin revealed that while absorptions at 6.1μ, 10.3μ and 11.0μ of the former have mostly disappeared or have become weak, absorptions at 3.0μ, 6.2μ, 6.3μ, 6.7μ and 8.0μ have shown up for the latter.

The foregoing results confirm that the phenol and oligomer have undergone a chemical reaction.

It has been further confirmed that when the oligomer was treated in the same condition without adding phenol there was hardly any perceivable change except a slight increase in its viscosity (7.9 poises).

EXAMPLE 2

100 parts of colorless liquid butadiene oligomer having a structure consisting mostly of 1,2-linkages and having a viscosity of 1,500 poises (at 25°C) and sold under the tradename Nisso PB-B 3000 was kept at more than 38°C. 98 parts of colorless liquid phenol containing water which was kept at the same temperature was added, and the mixture was then sufficiently mixed so as to make it uniform. This admixture was in an emulsified state and opaque. Next, 4 parts of boron trifluoride-phenol complex was added as a catalyst and reacted 2 hours at 60°C., then the reaction mixture was discharged into cold water, and after washing with water, it was dehydrated and further dried under vacuum. As a result, 160 parts of reddish transparent solid resin having a softening point of 45°C was obtained.

Comparison of the absorption bands of infrared spectroscopy of the oligomer itself with the product resin confirmed quite similar results as observed in Example 1. Furthermore, when the original liquid oligomer was treated in the same condition except without the presence of phenol, the viscosity increased to 1,550 poises.

EXAMPLE 3

100 parts of phenol was added together with 61.7 parts of formalin (37% aqueous solution) and to this mixture 0.52 parts of concentrated sulfuric acid was added. The mixture was reacted 2 hours at 100°C, then it was dehydrated under vacuum, and the condensation reaction was continued until the solution viscosity (resin/toluene/methyl ethyl ketone = 2/1/1, hereinafter it was carried by the same method) became 1,231 centistokes (at 25°C). Next, 20 parts of liquid butadiene oligomer having a structure comprised mostly of 1,4-linkages and having a solution viscosity of 15.04 centistokes, and sold under the tradename Polyoel Huels 130 and 4 parts of sulfuric acid-phenol complex (catalyst) were added to the dehydrate described above. The resulting mixture was reacted 3 hours at 100°C, and then further heated to 180°C in 3 hours, and the polymerization reaction further advanced by eliminating unreacted materials under vacuum, then 135 parts of a brownish solid resin was obtained.

The melting point of resin obtained herein was 85°C. The gelation time of the resin at 165°C was 52 seconds when 8% of hexamethylenetetramine was added, and its flow (at 125°C) was 24 mm. On the other hand, the result of infrared spectroscopic analysis of the resin which was produced by the process described above and without the addition of hexamethylenetetramine was found to show a quite similar tendency as the result described in Example 1. And, the results of benzene extraction test by the Soxhlet extractor were as follows:

Table 1

| (Test Materials) | The Results of Benzene Extraction test (Extraction Rate by Benzene) |
|---|---|
| Phenolic Resin | 2.1% |
| Oligomer | 100.0 |
| Mixture before Reaction in Example 3. | 15.1 |
| Product after Reaction in Example 3. | 2.5 |
| Cured Material after Reaction in Example 3. | 2.0 |

The table indicates that a simple phenol-formaldehyde resin is mostly insoluble in benzene, but the oligomer is 100% soluble. Even so, the product resin of Example 3 was little extracted by the benzene extraction test, then it is considered that the oligomer has reacted almost perfectly with the phenolic resin which was mixed with it.

It has also been confirmed that, when the oligomer itself was independently treated under the same conditions described above, there was only a slight increase in the solution viscosity from 15.04 to 22.58 centistokes at 25°C.

EXAMPLE 4

80 parts of para-tertiary-butyl phenol 31.2 parts of paraform (purity, 80%) and 0.04 part of surface active agent were mixed by stirring about 1 hour at around 80°C, then the mixture formed a slurry. 4 parts of triethylamine was added to the slurry and was reacted 2 hours at 100°C, and the condensation reaction further advanced during dehydration under vacuum until a resinous product which has a softening point of 62°C, an acid value of 74 and a methylol group content of 16% was obtained. Then, 95 parts of a butadiene-isobutylene co-oligomer having a structure comprised mostly of 1,4-linkages and having a viscosity of 60.5 poises (at 25°C), and sold under the tradename SK 100 (Tonen) and 0.2 part of ferric chloride hexahydrates used as a catalyst were added together to the resin described above, and this mixture was reacted 1 hour at 200°C under nitrogen. Then the polymerization reaction was continued during the elimination of unreacted materials using nitrogen as carrier gas until 175 parts of a brownish solid resin was obtained.

The resin obtained herein had a softening point of 105°C, an acid value of 10 and a methylol group content of 0.3%. And, the result of the infrared spectroscopic analysis mostly matched the description in Example 1, with the exception that the absorption in 9.9μ arising from the methylol group of phenolic resin having disappeared. So it became clear that the Chroman theory and/or the Methylene-Quinone theory is applicable to this reaction described above.

When the oligomer itself was treated independently under the condition described above, there was only a little increase from 60.5 to 61.8 poises in solution viscosity.

EXAMPLE 5

100 parts of the resin obtained in Example 1 was mixed with 100 parts of natural rubber on a mixing roll, then dissolved in 600 parts of toluene and used as a rubber cement. Several sets of canvas strips were used as adherends and they were bonded with the rubber cement, and the bonding strengths were tested by the 180° peel test.

Following are the results obtained which proved the rubber cement to be conspicuously better than such rubber cements generally blended with rosin.

Table 2

| Test Results of Peel Bonding Strength | | |
|---|---|---|
| | | (unit: kg/in) |
| Time Passed After Adhesion | Blended Material Resin Product of Example 1 | Rosin Blend |
| One hour | 1.5 | 0.2 |
| One week | 2.4 | 0.3 |

EXAMPLE 6

When 8 percent of hexamethylenetetramine was mixed with the resin product of Example 3, and this mixture was used as an ingredient of the following synthetic rubber molding material, the cured piece was remarkably improved in mechanical properties, such as hardness and tensile strength, as shown in Table 3.

It is evident that the modified resin prepared by this invention is highly effective in reinforcing rubbers.

Table 3

| Component | Parts per Hundred of Rubber | |
|---|---|---|
| Hycar No. 1002 | 100 | 100 |
| Zinc White | 5 | 5 |
| Stearic Acid | 1.5 | 1.5 |
| Sulfur | 1.5 | 1.5 |
| Vulcanizing Accelerator (DM) | 1.5 | 1.5 |
| Resin Product of Example 3 mixed with Hexamethylenetetramine | 0 | 50 |
| Vulcanization (154.5°C × 30 minutes) | | |
| Hardness (Shore A) | 45 | 89 |
| Tensile Strength (kg/cm²) | 21 | 151 |
| Elongation (%) | 380 | 310 |

Various modifications and variations of the invention can be made so that the foregoing specific embodiments are to be taken as illustrative and not to limit the invention.

We claim:
1. In the process for the preparation of a reaction product of a phenol-aldehyde resin and an olefinically unsaturated polymer the improvement which comprises employing as the unsaturated polymer a liquid chain growth polymer of a conjugated hydrocarbon diene monomer or mixture of said diene and a compatible hydrocarbon monoolefin comonomer, said mixture containing at least about 20 weight percent of said diene, said polymer being greater than a dimer, having a molecular weight less than 10,000 and being substantially devoid of conjugated unsaturation, said reaction of phenol aldehyde resin and liquid polymer being carried out in the presence of a strong acid catalyst.
2. The process of claim 1 wherein the strong acid catalyst is a mineral acid catalyst.
3. The process of claim 2 wherein the diene monomer is selected from the group consisting of butadiene, isoprene, pentadiene and mixtures thereof.
4. The process of claim 3 wherein the liquid polymer is a polymer of the conjugated hydrocarbon diene monomer.
5. The process of claim 4 wherein the aldehyde is formaldehyde.
6. The process of claim 5 wherein the phenol-formaldehyde resin is a phenol-formaldehyde resole resin.
7. The process of claim 5 wherein the phenol formaldehyde resin is a phenol formaldehyde novolac resin.
8. The process of claim 3 wherein the liquid polymer is the polymer of the diene monomer and mono-olefinic comonomer.
9. The process of claim 8 wherein the aldehyde is formaldehyde.
10. The process of claim 9 wherein the phenol-formaldehyde resin is a phenol-formaldehyde novolac resin.
11. The process of claim 9 wherein the phenol-formaldehyde resin is a phenolformaldehyde resale resin.
12. The process of claim 11 wherein the liquid polymer is a butadiene-isobutylene polymer having substantially 1,4 linkages, the phenol is para tertiary butyl phenol, and the strong acid catalyst is ferric chloride hexahydrate.
13. The polymer product of claim 1.
14. The polymer product of claim 12.

* * * * *